(12) United States Patent
Guimard et al.

(10) Patent No.: US 10,457,591 B2
(45) Date of Patent: *Oct. 29, 2019

(54) SUBSTRATE PROVIDED WITH A STACK HAVING THERMAL PROPERTIES COMPRISING AT LEAST ONE NICKEL OXIDE LAYER

(71) Applicant: SAINT-GOBAIN GLASS FRANCE, Courbevoie (FR)

(72) Inventors: Denis Guimard, Paris (FR); Silvia Mariani, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/780,858

(22) PCT Filed: Dec. 1, 2016

(86) PCT No.: PCT/FR2016/053170
§ 371 (c)(1),
(2) Date: Jun. 1, 2018

(87) PCT Pub. No.: WO2017/093675
PCT Pub. Date: Jun. 8, 2017

(65) Prior Publication Data
US 2018/0362397 A1  Dec. 20, 2018

(30) Foreign Application Priority Data

Dec. 2, 2015 (FR) .................................... 15 61720

(51) Int. Cl.
*B32B 15/04* (2006.01)
*B32B 17/06* (2006.01)
*C03C 17/36* (2006.01)

(52) U.S. Cl.
CPC .......... *C03C 17/3652* (2013.01); *C03C 17/36* (2013.01); *C03C 17/366* (2013.01);
(Continued)

(58) Field of Classification Search
USPC ................................ 428/428, 432, 434, 688
See application file for complete search history.

(56) References Cited

U.S. PATENT DOCUMENTS 7,597,962 B2 * 10/2009 Butz ....................... C03C 17/36
428/432
2002/0021495 A1   2/2002 Lingle
(Continued)

FOREIGN PATENT DOCUMENTS

WO    WO 2015/067895 A1    5/2015

OTHER PUBLICATIONS

International Search Report dated Feb. 8, 2017 in PCT/FR2016/053170 filed Dec. 1, 2016.

*Primary Examiner* — Lauren R Colgan
(74) *Attorney, Agent, or Firm* — Oblon, McClelland, Maier & Neustadt, L.L.P.

(57) ABSTRACT

A transparent substrate is provided, on a main face, with a stack of thin layers including at least one, metallic functional layer having properties of reflection in the infrared region and/or in the solar radiation region, based on silver or on silver-containing metal alloy, and two antireflective coatings. The antireflective coatings each include at least one dielectric layer. The functional layer is positioned between the two antireflective coatings. At least one nickel oxide $Ni_xO$ layer is located under the functional layer in the direction of the substrate and/or above the functional layer, with interposition of at least one layer or of just one layer made of a different material between the or each nickel oxide $Ni_xO$ layer and the functional layer.

20 Claims, 3 Drawing Sheets

(52) U.S. Cl.
CPC ...... *C03C 17/3644* (2013.01); *C03C 17/3681* (2013.01); *C03C 2217/216* (2013.01); *C03C 2217/217* (2013.01); *C03C 2217/256* (2013.01); *C03C 2217/73* (2013.01)

(56) References Cited

U.S. PATENT DOCUMENTS

| | | |
|---|---|---|
| 2002/0192474 A1 | 12/2002 | Lingle |
| 2003/0104221 A1* | 6/2003 | Stachowiak ............ C03C 17/36 428/432 |
| 2003/0150711 A1 | 8/2003 | Laird |
| 2005/0025917 A1 | 2/2005 | Laird et al. |
| 2005/0042460 A1* | 2/2005 | Kriltz ................ B32B 17/10174 428/432 |
| 2005/0164015 A1 | 7/2005 | Laird et al. |
| 2006/0046072 A1 | 3/2006 | Ferreira et al. |
| 2007/0128451 A1 | 6/2007 | Ferreira et al. |
| 2011/0284366 A1 | 11/2011 | Laird et al. |
| 2013/0323514 A1 | 12/2013 | Laird et al. |
| 2016/0244361 A1 | 8/2016 | Rondeau et al. |

* cited by examiner

SUBSTRATE PROVIDED WITH A STACK HAVING THERMAL PROPERTIES COMPRISING AT LEAST ONE NICKEL OXIDE LAYER

The invention relates to a transparent substrate in particular made of a rigid mineral material, such as glass, said substrate being coated with a stack of thin layers comprising a functional layer of metallic type which can influence solar radiation and/or long wavelength infrared radiation.

The invention more particularly relates to the use of such substrates for manufacturing thermal insulation and/or solar protection glazings. These glazings may be intended to equip both buildings and vehicles, in particular with a view to reducing the air-conditioning load and/or preventing excessive overheating ("solar control" glazings) and/or reducing the amount of energy dissipated toward the outside ("low-e" glazings) driven by the ever increasing importance of glazed surfaces in buildings and vehicle compartments.

These glazings can furthermore be incorporated in glazings having specific functionalities, such as, for example, heated glazings or electrochromic glazings.

One type of stack of layers known for conferring such properties on substrates consists of a metallic functional layer having properties of reflection in the infrared region and/or in the solar radiation region, in particular a metallic functional layer based on silver or on a silver-containing metal alloy.

In this type of stack, the functional layer is thus positioned between two antireflective coatings each generally comprising several layers which are each made of a dielectric material of the nitride type, in particular silicon nitride or aluminum nitride, or of the oxide type. From the optical viewpoint, the aim of these coatings, which frame the metallic functional layer, is to render this metallic functional layer "anti reflective".

A blocker coating is, however, sometimes inserted between a or each antireflective coating and the metallic functional layer; the blocker coating positioned under the functional layer in the direction of the substrate protects it during a possible high-temperature heat treatment, of the bending and/or tempering type, and the blocker coating positioned on the functional layer on the opposite side from the substrate protects this layer from possible degradation during the deposition of the upper antireflective coating and during a possible high-temperature heat treatment, of the bending and/or tempering type.

It is known, for example from the European patent application No. EP 718 250, that a "wetting" dielectric layer based on zinc oxide positioned directly under a silver-based metallic functional layer, in the direction of the carrying substrate, promotes the achieving of an appropriate crystallographic state of the metallic functional layer while exhibiting the advantage of being able to withstand a high-temperature bending or tempering heat treatment.

Furthermore, this document discloses the favorable effect of the presence of a layer deposited in the metallic form directly on and in contact with the silver-based functional layer for the protection of the functional layer during the deposition of the other layers on top and during a high-temperature heat treatment. A person skilled in the art knows this type of layer under the generic term of "blocker layer" or "blocker".

There are additionally known, from the international patent application No. WO 2010/142926, different solutions for carrying out a flash heating of a stack of thin layers comprising one or more silver-based functional layers. The treatment by flash heating makes it possible to improve the quality of the metallic functional layer and thus to reduce the emissivity (which is directly related to the sheet resistance) and the use of an absorbent intermediate layer makes it possible to increase the absorption of the stack during the treatment in order for it to be short but effective. As the absorbent intermediate layer becomes transparent during the treatment, the optical characteristics of the stack after treatment are advantageous (a high light transmission can in particular be obtained).

The aim of the invention is to succeed in overcoming the disadvantages of the prior art by developing a novel type of stack of layers functional monolayer or functional multilayers, which stack exhibits a reduced sheet resistance (and thus a reduced emissivity) after a (or two or more) high-temperature heat treatment(s) of the bending and/or tempering and/or annealing and/or flash heating type.

It has been discovered that, surprisingly, the presence of a nickel oxide layer in such a stack close to a metallic functional layer has very favorable effects on reducing the sheet resistance of the stack in the case where this nickel oxide layer is not directly in contact with this silver-based metallic functional layer.

A subject-matter of the invention is thus, in its broadest sense, a transparent substrate as claimed in claim 1. This substrate is provided, on a main face, with a stack of thin layers comprising at least one, indeed even just one, metallic functional layer having properties of reflection in the infrared region and/or in the solar radiation region, in particular based on silver or on silver-containing metal alloy, and two antireflective coatings, said antireflective coatings each comprising at least one dielectric layer, said functional layer being positioned between the two antireflective coatings, at least one nickel oxide $Ni_xO$ layer being located under said functional layer in the direction of the substrate and/or above said functional layer without contact with the functional layer, with interposition of at least one layer or of just one layer made of a different material between said or each nickel oxide $Ni_xO$ layer and said functional layer.

The layer(s) interposed between the metallic functional layer and the $Ni_xO$ layer is neither a silver-based metallic functional layer nor a nickel oxide layer; preferably, this (or these) layer(s) interposed between the metallic functional layer and the $Ni_xO$ layer is not a nitride, that is to say does not comprise nitrogen.

"Metallic layer" within the meaning of the present invention should be understood as meaning that the layer comprises neither oxygen nor nitrogen.

"Coating" within the meaning of the present invention should be understood as meaning that there may be a single layer or several layers of different materials within the coating.

"In contact" is understood to mean, within the meaning of the invention, that no layer is interposed between the two layers under consideration.

"Based on" is understood to mean, within the meaning of the invention, that the element or the material thus denoted is present at more than 50 atom % in the layer under consideration.

Advantageously, the single (or the) metallic functional layer(s) having properties of reflection in the infrared region and/or in the solar radiation region is (or are) a (or two or more) continuous layer(s).

In fact, according to the invention, the nickel oxide $Ni_xO$ layer does not comprise any other element than Ni and O. The material constituting this layer can be described as: "pure nickel oxide".

The expression "$Ni_xO$" is targeted at the fact that there may be $Ni_1O_1$ but also that the constituent material of the layer may not exhibit precisely this stable stoichiometry:

the material of the layer may be slightly superstoichiometric in Ni, for example with a $0.8 \leq x < 1$ and in particular $0.8 \leq x \leq 0.95$, or the material of the layer may be slightly substoichiometric in Ni, for example with a $1 < x \leq 1.2$ and in particular $1.05 \leq x \leq 1.2$.

In a specific alternative form, a single oxide-based layer, in particular a layer based on zinc oxide, is interposed under said functional layer in the direction of the substrate, between said nickel oxide $Ni_xO$ layer and said functional layer, in order to obtain an even more favorable effect with regard to the crystallographic state of the nickel oxide layer.

In a very specific alternative form, a single metallic layer, in particular a layer comprising Ni and/or Cr or a layer comprising Ge, is interposed between said nickel oxide $Ni_xO$ layer and said functional layer under said functional layer in the direction of the substrate and/or above said functional layer on the opposite side from the substrate, in order to make possible a blocking and/or wetting function.

In another alternative form, a metallic layer, in particular comprising nickel and chromium, is located under and in contact with the functional layer, with a physical thickness of said metallic layer of at least 0.3 nm, indeed even between 0.6 and 8.0 nm, indeed even between 1.0 and 5.0 nm, and an oxide-based layer, in particular a layer based on zinc oxide, is interposed between said metallic layer and said nickel oxide $Ni_xO$ layer which is located under said functional layer in the direction of the substrate.

In a very specific alternative form, a layer based on zinc oxide is located below, in the direction of said substrate, and in contact with said nickel oxide $Ni_xO$ layer. This is because it has been found that the crystallographic orientation of the zinc oxide has a favorable effect on the crystallographic orientation of the nickel oxide.

Preferably, said nickel oxide $Ni_xO$ layer exhibits an x between 1.2 and 0.5, indeed even between 0.9 and 0.6.

The physical thickness of said nickel oxide $Ni_xO$ layer is preferably between 0.3 and 10.0 nm, indeed even between 0.6 and 8.0 nm, indeed even between 1.0 and 5.0 nm. A relatively thin nickel oxide $Ni_xO$ layer makes it possible to limit the light absorption effect; a relatively thick nickel oxide $Ni_xO$ layer makes it possible to ensure that the desired effect of improving the quality of the metallic functional layer is obtained.

The stack can comprise a nickel oxide $Ni_xO$ layer under said functional layer in the direction of the substrate and a nickel oxide $Ni_xO$ layer above said functional layer on the opposite side from the substrate. The x is preferably the same for these two layers in order to facilitate the deposition.

The physical thickness of the only (or of all the) layer(s) interposed (if there are several of them) between said nickel oxide $Ni_xO$ layer (under and/or above the functional layer) and said functional layer is preferably between 0.5 and 15.0 nm, indeed even between 0.7 and 8.0 nm, indeed even between 1.0 and 6.0 nm.

There also exists a specific alternative form in which two nickel oxide layers in contact with one another are located under said functional layer in the direction of the substrate and/or two nickel oxide layers in contact with one another are located above said functional layer, the nickel oxide $Ni_yO$ layer closest to said functional layer being less oxidized than the other, more distant, nickel oxide $Ni_xO$ layer. This is because a more oxidized nickel oxide layer is a better blocker and a less oxidized nickel oxide layer is a better light absorbent.

Said underlying antireflective and overlying antireflective coatings preferably each comprise at least one dielectric layer based on silicon nitride, optionally doped using at least one other element, such as aluminum.

The stack can thus comprise a final layer (overcoat), that is to say a protective layer.

This protective layer preferably exhibits a physical thickness of between 0.5 and 10 nm.

The glazing according to the invention incorporates at least the substrate carrying the stack according to the invention, optionally in combination with at least one other substrate. Each substrate can be clear or tinted. One of the substrates at least in particular can be made of bulk-tinted glass. The choice of coloration type will depend on the level of light transmission and/or on the colorimetric appearance which are desired for the glazing once its manufacture has been completed.

The glazing according to the invention can exhibit a laminated structure, combining in particular at least two rigid substrates of the glass type by means of at least one sheet of thermoplastic polymer, in order to exhibit a structure of glass/stack of thin layers/sheet(s)/glass type. The polymer can in particular be based on polyvinyl butyral PVB, ethylene/vinyl acetate EVA, polyethylene terephthalate PET or polyvinyl chloride PVC.

The glazing can furthermore exhibit a structure of glass/stack of thin layers/polymer sheet(s) type.

The glazings according to the invention are capable of being subjected to a heat treatment without damage to the stack of thin layers. The are thus optionally bent and/or tempered.

The glazing can be bent and/or tempered while consisting of a single substrate, that provided with the stack. It is then a "monolithic" glazing. In the case where they are bent, in particular for the purpose of forming glazings for vehicles, the stack of thin layers is preferably found on a face which is at least partially nonplanar.

The glazing can also be a multiple glazing, in particular a double glazing, it being possible for at least the substrate carrying the stack to be bent and/or tempered. It is preferable in a multiple glazing configuration for the stack to be positioned so as to face the inserted gas-filled cavity. In a laminated structure, the stack can be in contact with the polymer sheet.

The glazing can also be a triple glazing consisting of three glass sheets separated in pairs by a gas-filled cavity. In a triple glazing structure, the substrate carrying the stack can be on face 2 and/or on face 5, when it is considered that the incident direction of the sunlight traverses the faces in increasing order of their number.

When the glazing is monolithic or multiple, of the double glazing, triple glazing or laminated glazing type, at least the substrate carrying the stack can be made of bent or tempered glass, it being possible for this substrate to be bent or tempered before or after the deposition of the stack.

In an independent alternative form, the transparent substrate is provided, on a main face, with a stack of thin layers comprising two metallic functional layers having properties of reflection in the infrared region and/or in the solar radiation region, in particular based on silver or on silver-containing metal alloy, and three antireflective coatings, said antireflective coatings each comprising at least one dielectric layer, each functional layer being positioned between the two antireflective coatings, with, starting from the substrate, at least one nickel oxide $Ni_xO$ layer which is located under the first functional layer and at least one nickel oxide $Ni_xO$ layer which is located under the second functional layer and with interposition of at least one layer or of just one layer made of a different material between each nickel oxide $Ni_xO$ layer and each functional layer located on top.

Advantageously, the present invention thus makes it possible to produce a stack of thin layers metallic functional monolayer or metallic functional multilayers which exhibits a lower sheet resistance after heat treatment, without detrimentally influencing the optical parameters of the stack.

The details and advantageous characteristics of the invention emerge from the following nonlimiting examples, illustrated by means of the appended figures which illustrate.

Figure 1:
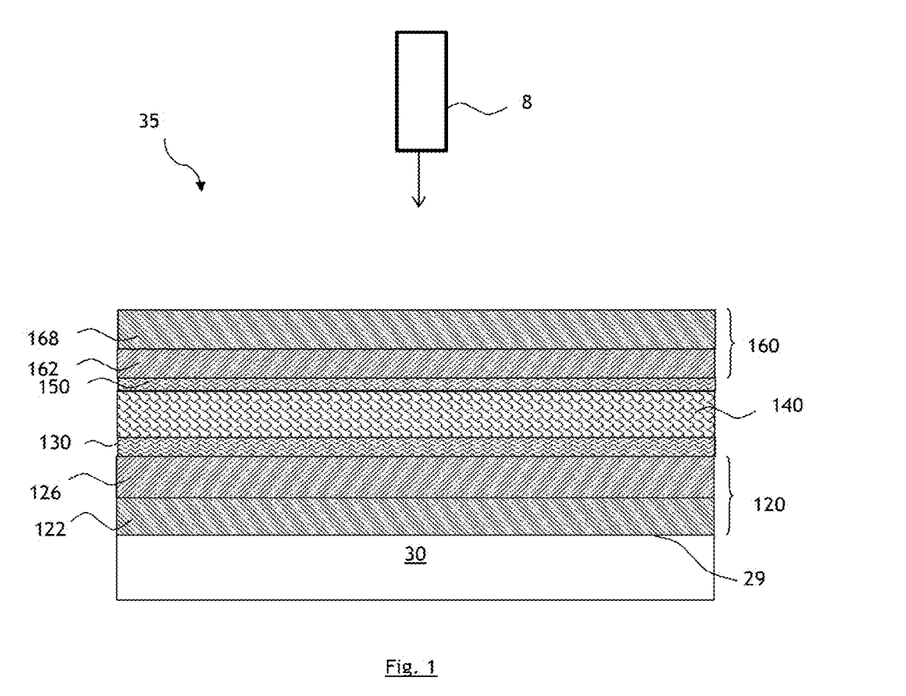
in FIG. 1, a functional monolayer stack according to the invention, the functional layer being deposited directly on an underblocker coating and directly under an overblocker coating, the stack being illustrated during the treatment using a source which produces radiation.
Figure 2:
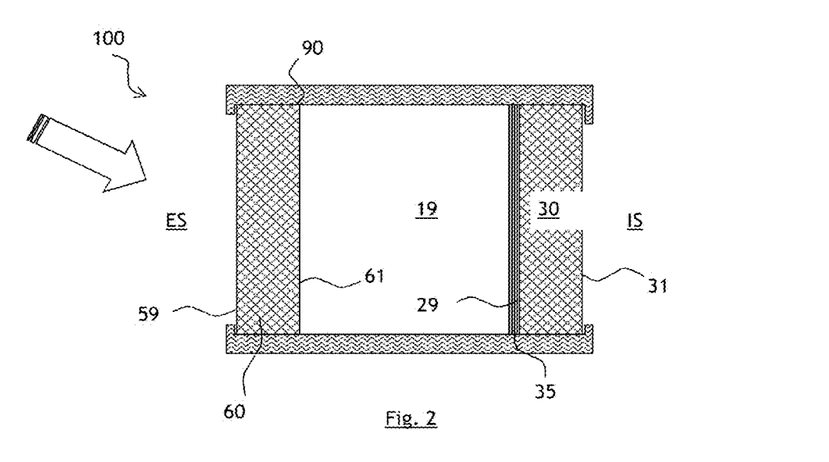
in FIG. 2, a double glazing solution incorporating a functional monolayer stack.
Figure 7:
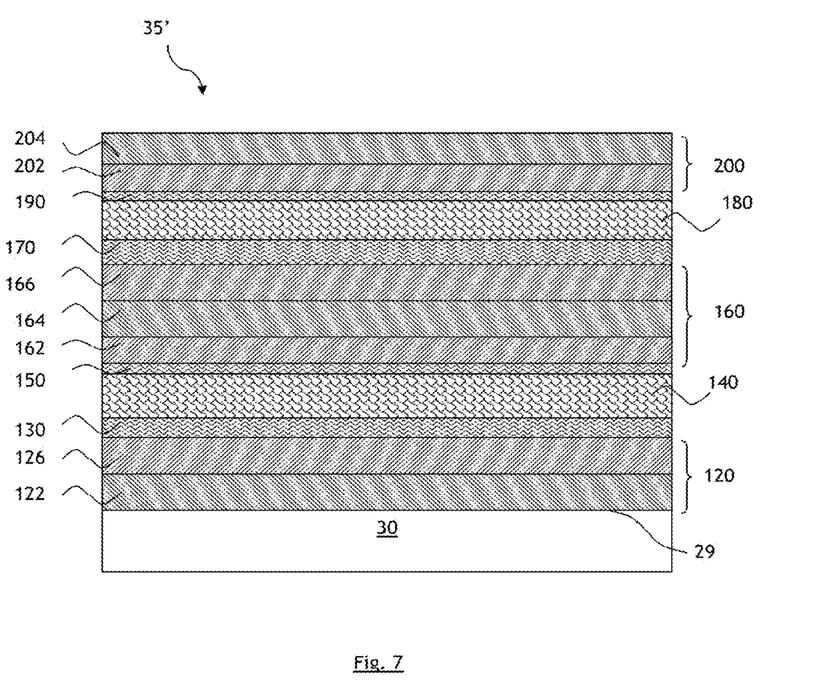

In FIGS. 1, 2 and 7, the proportions between the thicknesses of the different layers or of the different elements are not respected in order to make them easier to read.

FIG. 1 illustrates a structure of a functional monolayer stack 35 according to the invention deposited on a face 29 of a transparent glass substrate 30, in which the single functional layer 140, in particular based on silver or on a silver-containing metal alloy, is positioned between two antireflective coatings, the underlying antireflective coating 120 located under the functional layer 140 in the direction of the substrate 30 and the overlying antireflective coating 160 positioned above the functional layer 140 on the opposite side from the substrate 30.

These two antireflective coatings 120, 160 each comprise at least one dielectric layer 122, 126; 162, 168 and preferably each comprise at least two dielectric layers: in each dielectric coating, a dielectric layer 126, 162, preferably based on zinc oxide, which is closer to the functional layer 140, and a dielectric layer 122, 168, preferably based on silicon nitride, further from the functional layer 140.

Optionally, on the one hand, the functional layer 140 can be deposited directly on an underblocker coating 130 positioned between the underlying antireflective coating 120 and the functional layer 140 and, on the other hand, the functional layer 140 can be deposited directly under an overblocker coating 150 positioned between the functional layer 140 and the overlying antireflective coating 160.

The underblocker and/or overblocker layers, although deposited in metallic form and presented as being metallic layers, are sometimes in practice oxidized layers since one of their functions (in particular for the overblocker layer) is to become oxidized during the deposition of the stack in order to protect the functional layer.

According to the invention, at least one nickel oxide $Ni_xO$ layer (the layer 127 in tables 1 to 3, 6 below) is located under said functional layer 140 in the direction of the substrate 30 and/or at least one nickel oxide $Ni_xO$ layer (the layer 167 in tables 1 to 3, 6 below) is located above said functional layer 140, with interposition of at least one layer or of just one layer made of a different material between:

said nickel oxide $Ni_xO$ layer 127, 167 and said functional layer 140, or each nickel oxide $Ni_xO$ layer 127, 167 and said functional layer 140.

When a stack is used in a multiple glazing 100 of double glazing structure, as illustrated in FIG. 2, this glazing comprises two substrates 60, 30 which are held together by a frame structure 90 and which are separated from one another by an inserted gas-filled cavity 19. Each substrate 30, 60 thus respectively comprises an internal face 29, 61 in contact with the inserted gas-filled cavity 19, the other face 31, 59 of the substrate 30, 60 being in contact with the internal space IS and the external space ES respectively.

The glazing thus provides a separation between an external space ES and an internal space IS.

The stack can be positioned on face 3 (on the sheet furthest inside the building when considering the incident direction of the sunlight entering the building and on its face facing the gas-filled cavity).

FIG. 2 illustrates this positioning (the incident direction of the sunlight entering the building being illustrated by the double arrow) on face 3 of a stack of thin layers 35 positioned on an internal face 29 of the substrate 30 in contact with the inserted gas-filled cavity 19, the other face 31 of the substrate 30 being in contact with the internal space IS.

However, it can also be envisaged that, in this double glazing structure, one of the substrates exhibits a laminated structure.

For all the examples below, the conditions for deposition of the layers are:

| Layer | Target employed | Deposition pressure | Gas |
|---|---|---|---|
| $Si_3N_4$ | Si:Al at 92:8 wt % | $1.5 \times 10^{-3}$ mbar | $Ar/(Ar + N_2)$ at 22% |
| ZnO | Zn:O at 50:50 atom % | $2 \times 10^{-3}$ mbar | $Ar/(Ar + O_2)$ at 90% |
| SnZnO | Zn:Sn at 55:45 atom % | $2 \times 10^{-3}$ mbar | $Ar/(Ar + O_2)$ at 30% |
| NiCr | Ni:Cr at 80:20 atom % | $8 \times 10^{-3}$ mbar | Ar at 100% |
| $Ni_xO$ | Ni | $5 \times 10^{-3}$ mbar | $Ar/(Ar + O_2)$ at 87% |
| $Ni_yO$ | Ni | $5 \times 10^{-3}$ mbar | $Ar/(Ar + O_2)$ at 81% |
| Ag | Ag | $8 \times 10^{-3}$ mbar | Ar at 100% |

Figure 3:
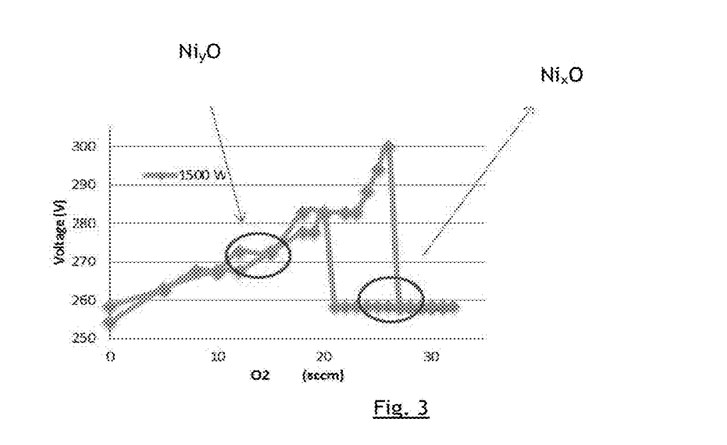
in FIG. 3, the hysteresis curve of the nickel oxide deposited from a metal target in the presence of oxygen.

The layers deposited can thus be classified into four categories:

i—layers of antireflective/dielectric material exhibiting an n/k ratio over the entire wavelength range of the visible region of greater than 5: $Si_3N_4$, ZnO;

ii—metallic functional layers made of material having properties of reflection in the infrared region and/or in the solar radiation region: Ag; it has been observed that silver exhibits a ratio 0<n/k<5 over the entire wavelength range of the visible region and its bulk electrical resistivity is less than $10^{-6}$ Ω·cm;

iii—underblocker and overblocker layers intended to protect the functional layer from a modification to its nature during the deposition of the stack;

iv—nickel oxide $Ni_xO$ and $Ni_yO$ layers; FIG. 3 illustrates the conditions for deposition of these two layers.

It should be noted that a $Ni_1O_1$ ceramic target has also been tested and led to similar results to those found with the examples below.

In all the examples below, the stack of thin layers is deposited on a substrate made of clear soda-lime glass with a thickness of 4 mm of the Planiclear brand, distributed by Saint-Gobain.

The physical thicknesses in nanometers of each of the layers or of the coatings of the examples, with reference to the configuration of FIG. 1, are set out in tables 1 to 3 below and the main data relating to these examples are brought together in tables 4 and 5.

In tables 1 to 3, the "No." column shows the number of the layer and the second column shows the coating, in connection with the configuration of FIG. 1; the third column shows the material deposited for the layer of the first column.

In these tables 1 to 3, the substrate 30 is located under the layer 122 and the layers of the examples are located in the order shown by the left-hand column, from the bottom upward starting from this substrate 30; the layers numbered in these tables which are not shown in FIG. 1 are thus localized in the examples in the same way as shown in the tables.

TABLE 1

| No. | | | Ex. 1 | 2 | 10 | 11 | 12 | 13 |
|---|---|---|---|---|---|---|---|---|
| 168 | 160 | $Si_3N_4$ | 20 | 20 | 20 | 20 | 20 | 20 |
| 162 | | ZnO | 5 | 5 | 5 | 5 | 5 | 5 |
| 150 | | NiCr | 1 | 1 | 1 | 1 | 1 | 1 |
| 140 | | Ag | 10 | 10 | 10 | 10 | 10 | 10 |
| 129 | 120 | Ge | — | — | — | 1 | 1 | |
| 128 | | ZnO | — | — | 5 | — | — | 5 |
| 127' | | $Ni_yO$ | — | — | — | — | 2 | — |
| 127 | | $Ni_xO$ | — | 5 | 5 | 5 | 3 | 5 |
| 126 | | ZnO | 5 | 5 | 5 | 5 | 5 | — |
| 122 | | $Si_3N_4$ | 20 | 20 | 20 | 20 | 20 | 20 |

In the first series of examples, that of table 1, for examples 10 to 13, the nickel oxide $Ni_xO$ layer 127 is in the underlying antireflective coating 120 and is separated from the metallic functional layer 140 by a dielectric layer 128 (ex. 10 and 13) based on zinc oxide, by a metallic layer 129 (ex. 11) made of germanium or by two layers, one of which, the layer 129, is metallic and made of germanium and the other of which, the layer 127', is an oxide and more specifically is made of nickel oxide $Ni_yO$ (ex. 12).

This nickel oxide $Ni_yO$ of the layer 127' is different from the nickel oxide $Ni_xO$ of the layer 127: with reference to FIG. 3, which illustrates the hysteresis curve of the nickel oxide deposited from a metal target in an oxidizing atmosphere (the abscissa shows the oxygen flow, in sccm, and the ordinate shows the voltage at the terminals of the target), the $Ni_xO$ is deposited under standard conditions resulting in an oxygen-rich oxide (in other words, superstoichiometric in oxygen, or stoichiometric in oxygen, indeed even slightly substoichiometric in oxygen), whereas the $Ni_yO$ is deposited under conditions resulting in a Ni-rich oxide (in other words, clearly substoichiometric in oxygen). The use of $Ni_yO$ results in a higher light absorption being obtained.

TABLE 2

| No. | | | Ex. 1 | 20 | 21 | 22 | 23 |
|---|---|---|---|---|---|---|---|
| 168 | 160 | $Si_3N_4$ | 20 | 20 | 20 | 20 | 20 |
| 167 | | $Ni_xO$ | — | 5 | 5 | 5 | 4 |
| 167' | | $Ni_yO$ | — | — | — | — | 1 |
| 162' | | SnZnO | — | — | — | 5 | — |
| 162 | | ZnO | 5 | 5 | — | 5 | — |
| 150 | | NiCr | 1 | 1 | 1 | 1 | 1 |
| 140 | | Ag | 10 | 10 | 10 | 10 | 10 |
| 126 | 120 | ZnO | 5 | 5 | 5 | 5 | 5 |
| 122 | | $Si_3N_4$ | 20 | 20 | 20 | 20 | 20 |

In the second series of examples, that of table 2, for examples 20 to 23, the nickel oxide $Ni_xO$ layer 167 is in the overlying antireflective coating 160 and is separated from the metallic functional layer 140 by a metallic layer 150 made of nickel-chromium alloy (ex. 21) or by two layers, one of which, the layer 150, is metallic and made of nickel-chromium alloy and the other of which, the layer 162, is an oxide based on zinc oxide (ex. 20) or is a nickel oxide $Ni_yO$ layer 167' (ex. 23), which are deposited in this order on the metallic functional layer, or by three layers (ex. 22) which are, in this order starting from the metallic functional layer: a metallic layer 150 made of nickel-chromium alloy, then a layer 162 based on zinc oxide and then a dielectric layer 162', which can be a mixed zinc tin oxide, a tin oxide or also a titanium oxide.

TABLE 3

| No. | | | Ex. 1' | 14 | 15 | 24 | 26 | 27 | 16 |
|---|---|---|---|---|---|---|---|---|---|
| 168 | 160 | $Si_3N_4$ | 20 | 20 | 20 | 20 | 20 | 20 | 20 |
| 167 | | $Ni_xO$ | — | — | — | 5 | 5 | 4 | — |
| 167' | | $Ni_yO$ | — | — | — | — | — | 1 | — |
| 162' | | SnZnO | — | — | — | — | 5 | — | — |
| 162 | | ZnO | 5 | 5 | 5 | 5 | — | — | 5 |
| 150 | | NiCr | 1 | 1 | 1 | 1 | 1 | 1 | 1 |
| 140 | | Ag | 10 | 10 | 10 | 10 | 10 | 10 | 10 |
| 130 | | NiCr | 1 | 1 | 1 | 1 | 1 | 1 | 1 |
| 128 | 120 | ZnO | — | — | 5 | — | — | — | — |
| 127 | | $Ni_xO$ | — | 5 | 5 | — | — | — | 5 |
| 126 | | ZnO | 5 | 5 | 5 | 5 | 5 | 5 | — |
| 122 | | $Si_3N_4$ | 20 | 20 | 20 | 20 | 20 | 20 | 20 |

In the third series of examples, that of table 3, for examples 14 to 16, the nickel oxide $Ni_xO$ layer 127 is in the underlying antireflective coating 120 and is separated from the metallic functional layer 140 by a metallic layer 130 made of nickel-chromium alloy (ex. 14 and 16) or by two layers, one of which is a metallic layer 150 made of nickel-chromium alloy and the other of which is a dielectric layer 128 made of oxide and more particularly based on zinc oxide (ex. 15).

For examples 24 to 27, the nickel oxide $Ni_xO$ layer 167 is in the overlying antireflective coating 160 and is separated from the metallic functional layer 140 by a metallic layer 150 made of nickel-chromium alloy (ex. 26) or by two layers, one of which is a layer 150 made of nickel-chromium alloy is metallic and the other of which is either a layer 162, which is an oxide and is based on zinc oxide (ex. 24), or is a nickel oxide $Ni_yO$ layer 167' (ex. 27), or by three layers (ex. 25) which are, in this order starting from the metallic functional layer: a metallic layer 150 made of nickel-chromium alloy, then a layer 162 based on zinc oxide and then a dielectric layer 162', which can be a mixed zinc tin oxide, a silicon oxide or also a titanium oxide.

TABLE 4

| Ex. | 1 | 2 | 10 | 20 | 21 |
|---|---|---|---|---|---|
| R (Ω/square) | 4.7 | 4.5 (−5%) | 3.5 (−25%) | 3.8 (−19%) | 4.1 (−13%) |
| Abs (%) | 9.4 | 9.4 | 7.0 | 10.0 | 10.0 |

TABLE 5

| Ex. | 1' | 14 |
|---|---|---|
| R (Ω/square) | 6.6 | 4.5 (−32%) |
| Abs (%) | 17.0 | 14.0 |

The characteristics of the substrate coated with the stack which are presented in tables 4 and 5 consist of the measurement, after a tempering heat treatment at 650° C. for 10 minutes and then a cooling operation:

for R, of the sheet resistance measured as usual with a four-point probe, in ohms per square, and for Abs, of the light absorption in the visible region in %, measured according to illuminant D65 2°, on the side opposite the main face of the substrate on which the stack of thin layers is deposited.

The value in brackets indicates, for table 4, the improvement (the decrease) in the sheet resistance with respect to the reference consisting of example 1 and, for table 5, the improvement (the decrease) in the sheet resistance with respect to the reference consisting of example 1'.

The difference between example 16 and example 14 is that, in the context of example 14 (as for the other examples), the nickel oxide $Ni_xO$ layer 127 is deposited directly on a layer based on zinc oxide 126 whereas, in the context of example 16, the nickel oxide $Ni_xO$ layer 127 is deposited directly on a layer 122 based on silicon nitride. It has been noticed that the sheet resistance of example 16 is higher than that of example 14 as this example 16 does not benefit from the favorable conditions obtained when the nickel oxide layer is deposited directly on a layer based on zinc oxide.

The heat treatment would have been able to consist of a forward progression of the substrate 30 at a rate of 10 m/min under a laser line 8. By way of example, such a laser line can have a width of 60 μm and a power of 25 W/mm with the laser line oriented perpendicularly to the face 29 and in the direction of the terminal layer of the stack, that furthest from the face 29, that is to say by positioning the laser line (illustrated by the straight black arrow) above the stack and by orienting the laser in the direction of the stack, as seen in FIG. 1.

Other tests have been carried out with a nickel oxide $Ni_xO$ layer 127 and/or a nickel oxide $Ni_xO$ layer 167 with a thickness of 1 nm and have given similar results.

Figure 4:
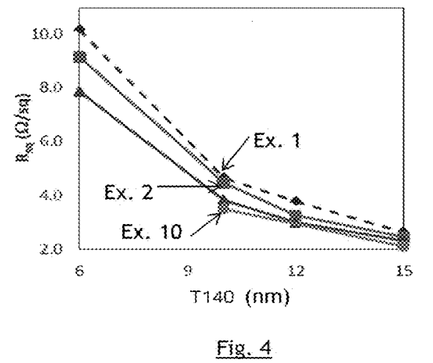
in FIG. 4, the sheet resistance after heat treatment for a series of examples based on examples 1, 2 and 10 as a function of the thickness of the metallic functional layer T140.

Other tests have been carried out. Tests have been carried out on the basis of examples 1, 2 and 10, with a metallic functional layer 140 made of silver, the thickness of this metallic functional layer 140 being modified. FIG. 4 shows, as a function of the thickness T140 of the metallic functional layer 140 (in nanometers), the sheet resistances obtained (in ohms per square):

for reference stacks based on example 1: noncontinuous curve, for reference stacks based on example 2, curve with squares, for stacks according to the invention based on example 10: curve with circles, and for stacks according to the invention based on example 10 but with, as additional difference, a layer 128 no longer of 5 nm but of 2 nm: curve with triangles.

This FIG. 4 thus shows that the sheet resistance is always improved (that is to say, decreased) when the metallic functional layer exhibits a thickness between 6 and 15 nm.

Figure 5:
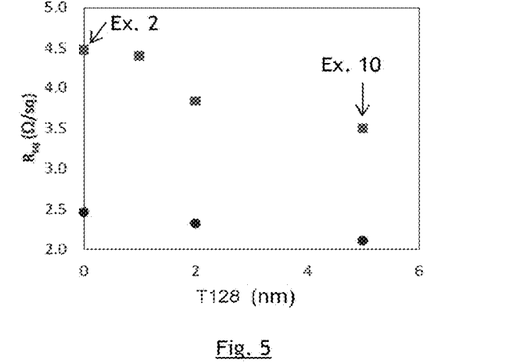
in FIG. 5, the sheet resistance after heat treatment for a series of examples based on examples 2 and 10 as a function of the thickness T128 of the layer 128.

FIG. 5 shows, as a function of the thickness T128 of the layer 128 (in nanometers), the sheet resistances obtained (in ohms per square):

for stacks based on example 10 and with a metallic functional layer 140 exhibiting a thickness of 10 nm: square points, for stacks based on example 10 but with a metallic functional layer 140 exhibiting a thickness of 15 nm: round points.

This FIG. 5 shows that the sheet resistance is always improved (that is to say, decreased) when a layer 128 is present with a thickness between 1 and 5 nm.

Tests have been carried out on the basis of example 20 of table 2: the thickness of the layer 167, initially 5 nm, was decreased in order to achieve the value of 1 nm and the sheet resistance of the stack after heat treatment then decreased by 18%, with respect to that of example 1 after heat treatment;

increased in order to achieve the value of 15 nm and the sheet resistance of the stack after heat treatment then decreased by 20%, with respect to that of example 1 after heat treatment;

Entirely surprisingly, the effect on the sheet resistance after heat treatment is comparable, whatever the thickness of the layer 167.

Figure 6:
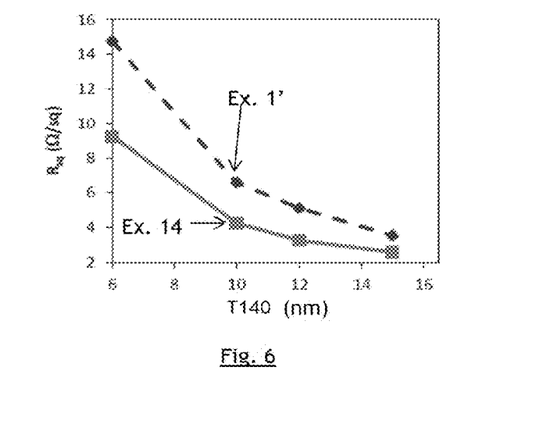
in FIG. 6, the sheet resistance after heat treatment for a series of examples based on examples 1' and 14 as a function of the thickness of the metallic functional layer T140; and in FIG. 7, a functional bilayer stack according to the invention, each functional layer being deposited directly on an underblocker coating and directly under an overblocker coating.

Tests have been carried out on the basis of examples 1' and 14 of table 3, with a metallic functional layer 140 made of silver, the thickness of this metallic functional layer 140 being modified. FIG. 6 shows, as a function of the thickness T140 of the metallic functional layer 140 (in nanometers), the sheet resistances obtained (in ohms per square):

for reference stacks based on example 1': noncontinuous curve, and for reference stacks based on example 14: curve with squares.

This FIG. 6 thus shows that the sheet resistance is always improved (that is to say, decreased) when the metallic functional layer exhibits a thickness between 6 and 15 nm.

Furthermore, tests have been carried out in an attempt to understand if the method of deposition of the $Ni_xO$ layer 127 and/or 167 could influence the improvements obtained. This is because a $Ni_xO$ layer can be obtained:

i. either by sputtering a metal target containing only Ni, in an atmosphere containing oxygen, indeed even, in addition, a neutral gas, such as argon;

ii. or by sputtering a "ceramic" target containing both Ni and oxygen, in an atmosphere containing a neutral gas, such as argon, indeed even, in addition, oxygen.

It has been found that the diffraction peak by XRD of the silver of the metallic functional layer 140 according to <200> was more pronounced in the case i; however, at an identical thickness (5 nm) of $Ni_xO$ layer 127 and/or 137, the improvement (decrease) in the sheet resistance with respect to the reference examples is the same.

On the basis of example 10, it has been found that a thick $Ni_xO$ layer 127, of 19 nm, deposited in the case i, improved even more (decreased even more) the sheet resistance, with a decrease of −22%, with respect to that of example 1 after heat treatment; however, the light absorption in the visible region, Abs, then rose to 22% after heat treatment.

It has furthermore been found that the resistivity of the $Ni_xO$ deposited according to the case i above, before heat treatment, was of the order of 190 μΩ.cm, i.e. a value close to that of ITO (approximately 200 μΩ.cm) and much higher than the resistivity of the silver used for the functional layer 140, which is of the order of 3 μΩ.cm; after the heat treatment at 650° C. for 10 minutes, the resistivity of this same $Ni_xO$ deposited according to the case i above fell to approximately 30 μΩ·cm.

The mechanical strength of example 10 has been tested and compared with that of example 1: it is as good for low loads and better for high loads.

FIG. 7 illustrates a structure of a functional bilayer stack 35' according to the invention deposited on a face 29 of a transparent glass substrate 30, in which the two functional layers 140 and 180, in particular based on silver or on a silver-containing metal alloy, are each positioned between two antireflective coatings, the underlying antireflective coating 120 located under the first functional layer 140 in the direction of the substrate 30, the intermediate antireflective coating 160 located between the two functional layers and the upper antireflective coating 200 positioned above the second and final functional layer 180 furthest from the substrate 30.

These three antireflective coatings 120, 160 and 200 each comprise at least one dielectric layer 122, 126; 162, 166, 168; 202, 204 and preferably each comprise at least two dielectric layers: in each dielectric coating, a dielectric layer 126, 162, 168, 202, preferably based on zinc oxide, which is closer to the functional layer, and a dielectric layer 122, 168, 204, preferably based on silicon nitride.

Optionally,
- on the one hand, at least one, and preferably each, functional layer 140, 180 can be deposited directly on a underblocker coating 130, 170 positioned between the antireflective coating located immediately below, respectively 120, 160, and the functional layer 140, 180, and
- on the other hand, at least one, and preferably each, functional layer 140, 180 can be deposited directly under an overblocker coating 150, 190 positioned between the functional layer 140, 180 and the antireflective coating located immediately above, respectively 160, 200.

Tests have been carried out in order to measure the effects of the invention for a stack comprising several functional layers. The structure of the stacks comprising two metallic functional layers 140, 180 are set out in table 6 below, which stacks were tested using a table structure similar to those of tables 1 to 3: the "No." column shows the number of the layer and the second column shows the coating, in connection with the configuration of FIG. 7; the third column shows the material deposited for the layer of the first column.

In this table 6, the substrate 30 is located under the layer 122 and the layers of the examples are located in the order shown by the left-hand column, from the bottom upward starting from this substrate 30; the layers numbered in this table which are not shown in FIG. 7 are thus localized in the examples in the same way as shown in the table.

TABLE 6

| No. | | | Ex. 4 | 40 | 41 | 42 |
|---|---|---|---|---|---|---|
| 208 | 200 | $Si_3N_4$ | 25 | 25 | 25 | 25 |
| 202 | | ZnO | 5 | 5 | 5 | 5 |
| 190 | | NiCr | 1 | 1 | 1 | 1 |
| 180 | | Ag | 20 | 20 | 20 | 20 |
| 170 | | NiCr | 1 | 1 | 1 | 1 |
| 168 | 160 | ZnO | — | — | 5 | 5 |
| 167 | | $Ni_xO$ | — | — | 5 | 5 |
| 166 | | ZnO | 5 | 5 | 5 | 5 |
| 164 | | $Si_3N_4$ | 80 | 80 | 80 | 80 |
| 162 | | ZnO | 5 | 5 | 5 | 5 |
| 150 | | NiCr | 1 | 1 | 1 | 1 |
| 140 | | Ag | 8 | 8 | 8 | 8 |
| 130 | | NiCr | 1 | 1 | 1 | 1 |
| 128 | 120 | ZnO | — | 5 | — | 5 |
| 127 | | $Ni_xO$ | — | 5 | — | 5 |
| 126 | | ZnO | 5 | 5 | 5 | 5 |
| 122 | | $Si_3N_4$ | 40 | 40 | 40 | 20 |

This series of examples has made it possible to measure the effects on the sheet resistance of the use of a nickel oxide layer:
- with example 40: under the first metallic functional layer 140 only of a functional bilayer stack,
- with example 41: under the second metallic functional layer 180 only of a functional bilayer stack, and
- with example 42: both under the first metallic functional layer 140 and under the second metallic functional layer 180 of a functional bilayer stack.

The sheet resistances R of the four examples, measured as above with a four-point probe, in ohms per square, after a tempering heat treatment at 650° C. for 10 minutes and then a cooling operation, are presented in table 7.

TABLE 7

| Ex. | 4 | 40 | 41 | 42 |
|---|---|---|---|---|
| R (Ω/square) | 2.12 | 1.98 (−7%) | 1.84 (−13%) | 1.70 (−20%) |

Thus, the use of a $Ni_xO$ layer 127 and/or 167 improves (decreases) the sheet resistance and there is a cumulative effect on applying the invention under each metallic functional layer of a stack comprising several metallic functional layers.

Furthermore, this improvement in the sheet resistance has also been observed on the basis of example 42, with the thickness of four blocker layers 130, 150, 170 and 190 each at 0.7 nm for one example and then decreased to 0.5 nm for another example, each compared with an example of the type of example 40 with, for one, the four blocker layers 130, 150, 170 and 190 at 0.7 nm and, for the other, these four layers at 0.5 nm.

In addition, this improvement in the sheet resistance has also been observed on the basis of example 42, with the thickness of two $Ni_xO$ layers 127 and 167 each at 2 nm, and also by decreasing the thickness of four blocker layers 130, 150, 170 and 190, each at 0.7 nm for one example and then at 0.5 nm for another example, and by comparing each with an example of the type of example 40 with, for one, the four blocker layers 130, 150, 170 and 190 at 0.7 nm and, for the other, these four layers at 0.5 nm.

As a result of the low sheet resistance obtained and also of the good optical properties (in particular the light transmission in the visible region), it is furthermore possible to use the substrate coated with the stack according to the invention to produce a transparent electrode substrate.

Generally, the transparent electrode substrate may be suitable for any heated glazing, for any electrochromic glazing, any display screen, or also for a photovoltaic cell (or panel) and in particular for a transparent photovoltaic cell backsheet.

The present invention is described in the preceding text by way of example. It is understood that a person skilled in the art is able to produce different alternative forms of the invention without, however, departing from the scope of the patent as defined by the claims.

The invention claimed is:

1. A transparent substrate provided, on a main face, with a stack of thin layers comprising at least one metallic functional layer having properties of reflection in the infrared region and/or in the solar radiation region, and two antireflective coatings, said antireflective coatings each comprising at least one dielectric layer, said functional layer being positioned between the two antireflective coatings, wherein at least one nickel oxide $Ni_xO$ layer is located under said functional layer in the direction of the substrate and/or above said functional layer, with interposition of at least one layer or of just one layer made of a different material between said nickel oxide $Ni_xO$ layer and said functional layer, and wherein said nickel oxide $Ni_xO$ layer is superstoichiometric in oxygen.

2. The substrate as claimed in claim 1, wherein a single oxide-based layer is interposed under said functional layer in the direction of the substrate, between said nickel oxide $Ni_xO$ layer and said functional layer.

3. The substrate as claimed in claim 2, wherein the single oxide-based layer is a layer based on zinc oxide.

4. The substrate as claimed in claim 1, wherein a single metallic layer is interposed between said nickel oxide $Ni_xO$ layer and said functional layer under said functional layer in the direction of the substrate and/or above said functional layer on the opposite side from the substrate.

5. The substrate as claimed in claim 4, wherein the single metallic layer is a layer comprising Ni and/or Cr or a layer comprising Ge.

6. The substrate as claimed in claim 1, wherein a metallic layer is located under and in contact with the functional layer, with a physical thickness of said metallic layer of at least 0.3 nm and an oxide-based layer interposed between said metallic layer and said nickel oxide $Ni_xO$ layer which is located under said functional layer in the direction of the substrate.

7. The substrate as claimed in claim 6, wherein the metallic layer comprises nickel and chromium and the thickness of the metallic layer is between 1.0 and 5.0 nm, and the oxide-based layer is a layer based on zinc oxide.

8. The substrate as claimed in claim 1, wherein a layer based on zinc oxide is located below and in contact with said nickel oxide $Ni_xO$ layer.

9. The substrate as claimed in claim 1, wherein said nickel oxide $Ni_xO$ layer exhibits an x between 0.9 and 0.5.

10. The substrate as claimed in claim 9, wherein said nickel oxide $Ni_xO$ layer exhibits an x between 0.9 and 0.6.

11. The substrate as claimed in claim 1, wherein the physical thickness of said nickel oxide $Ni_xO$ layer is between 0.3 and 10.0 nm.

12. The substrate as claimed in claim 11, wherein the physical thickness of said nickel oxide $Ni_xO$ layer between 1.0 and 5.0 nm.

13. The substrate as claimed in claim 1, wherein the physical thickness of the only or of all the layers interposed between said nickel oxide $Ni_xO$ layer and said functional layer is between 0.5 and 15.0 nm.

14. The substrate as claimed in claim 13, wherein the physical thickness of the only or of all the layers interposed between said nickel oxide $Ni_xO$ layer and said functional layer is between 1.0 and 6.0 nm.

15. The substrate as claimed in claim 1, wherein two nickel oxide layers in contact with one another are located under said functional layer in the direction of the substrate and/or above said functional layer, the nickel oxide $Ni_yO$ layer closest to said functional layer being less oxidized than the other, more distant, nickel oxide $Ni_xO$ layer.

16. The substrate as claimed in claim 1, wherein said underlying antireflective and overlying antireflective coatings each comprise at least one dielectric layer based on silicon nitride.

17. The substrate as claimed in claim 1, wherein the functional layer is based on silver or on silver-containing metal alloy.

18. A glazing comprising at least one substrate as claimed in claim 1.

19. The glazing as claimed in claim 18, mounted as a monolithic unit or as a multiple glazing unit of the double glazing or triple glazing or laminated glazing type, wherein at least the substrate carrying the stack is bent and/or tempered.

20. A method of using the substrate as claimed in claim 1, comprising producing a transparent electrode of a heated glazing or of an electrochromic glazing or of a lighting device or of a display device or of a photovoltaic panel from the substrate.

\* \* \* \* \*